United States Patent Office 3,369,603
Patented Feb. 20, 1968

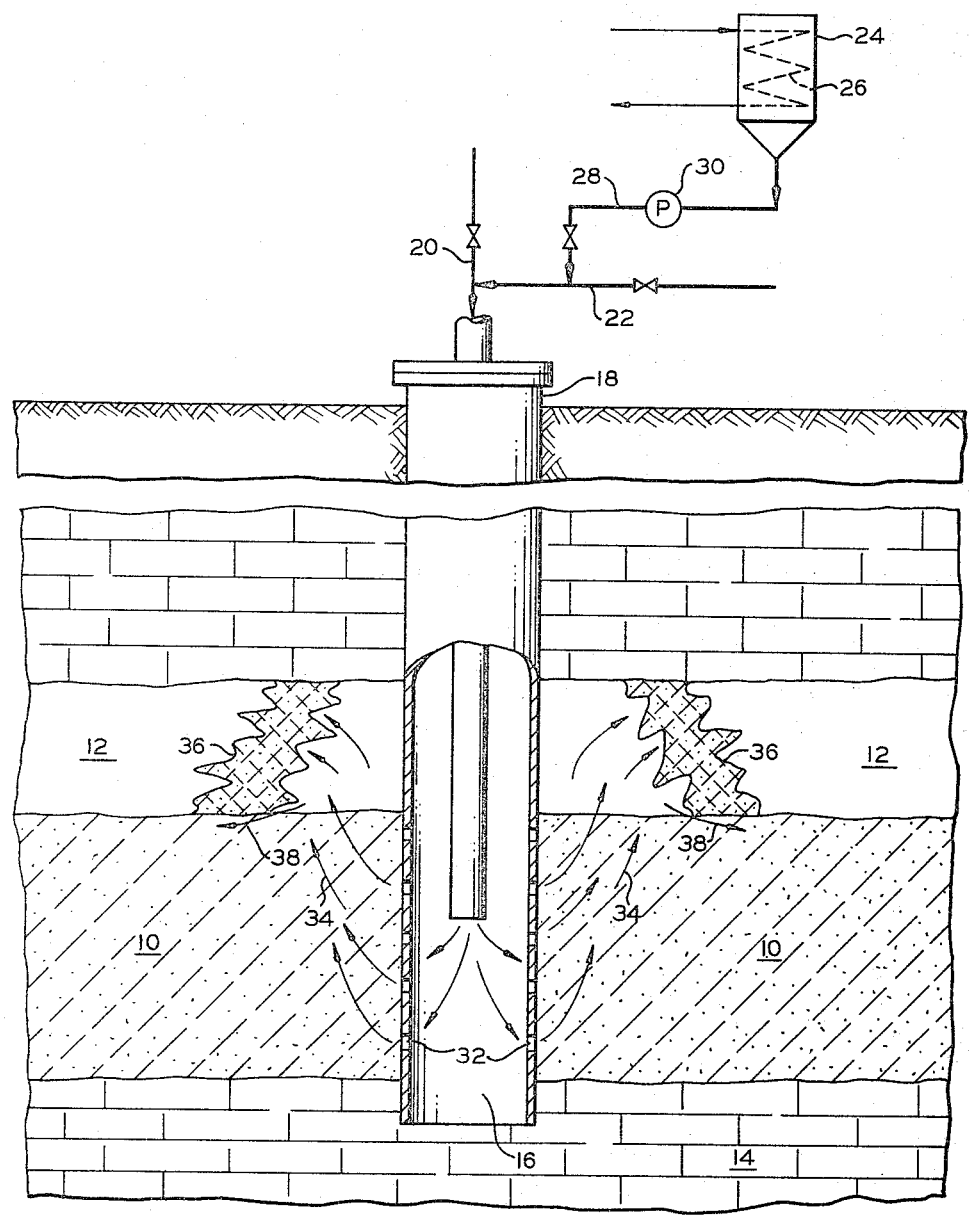

3,369,603
PLUGGING OF A FORMATION ADJACENT
AN OIL STRATUM
Joseph C. Trantham, Bartlesville, Okla., assignor to
Phillips Petroleum Company, a corporation of
Delaware
Filed Sept. 2, 1965, Ser. No. 484,703
9 Claims. (Cl. 166—10)

ABSTRACT OF THE DISCLOSURE

In producing oil by fluid drive from an injection well to a production well in an oil stratum adjacent a permeable formation containing a fluid other than oil, such as water or gas, a fracture is produced in the formation near the oil stratum, extending radially from the injection well, and steam containing vaporized solid which is water insoluble and oil soluble is injected into the formation thru the fractured area to plug and block off the flow of fluid from the stratum to the formation before injecting the driving fluid to produce oil. Naphthalene, diphenyl, anthracene, and the like are typical vaporizable solids for use in the process.

This invention relates to a process for plugging a permeable stratum containing a fluid other than oil, such as gas or water, lying adjacent an oil stratum to prevent loss of driving fluid while producing the oil stratum.

The use of fluid drive in producing oil strata is an accepted technique in the petroleum industry. Driving fluids comprise gases such as air, combustion gas, normally gaseous hydrocarbons, light liquid hydrocarbons, water (which may contain various additives which assist in displacing oil, including surfactants, $CO_2$, and the like), steam, hot water, etc.

One of the problems which is encountered in a fluid drive process as applied to an oil stratum is in the loss of driving fluid to an adjacent permeable stratum which contains water (a subjacent aquifer) or a gas cap (on top of the oil stratum). One such oil stratum is found in the Smackover field in Arkansas. When injecting driving fluid into such an oil stratum, large quantities of the driving fluid are usually lost in the adjacent formation. This is particularly true when injecting steam into the oil stratum as the driving fluid.

This invention is concerned with a process or method for preventing substantial loss of driving fluid, such as steam or hot water, into an adjacent permeable formation containing a fluid other than oil.

Accordingly, it is an object of the invention to provide a process for sealing off or plugging a permeable formation containing a fluid other than oil and lying adjacent an oil stratum. A further object is to provide a process for producing oil from an oil stratum lying adjacent a permeable stratum while avoiding substantial loss of fluids to the adjacent stratum. Another object is to provide a process for producing an oil stratum utilizing a hot aqueous driving fluid which avoids loss of driving fluid to an adjacent permeable stratum containing water or gas. Other objects of the invention will become apparent to one skilled in the art upon consideration of the accompanying disclosure.

A broad aspect of the invention as applied to a permeable formation containing fluid other than oil lying contiguous to or adjacent an oil stratum comprises injecting into the oil stratum thru a well therein a mixture of a fluidized solid which is water insoluble but soluble in the crude oil in the stratum and steam in sufficient quantity to effect plugging and sealing of said formation adjacent the stratum, and thereafter injecting a driving fluid such as steam or hot water thru the injection well into the stratum so as to drive the fluid solid into the adjacent formation where it changes to solid form due to cooling thereof. In such a subterranean arrangement of strata as that described, when producing oil by fluid drive, the driving fluid normally channels into the adjacent permeable stratum a relatively short distance from the injection well. In order to assure that the vaporous solid reaches the adjacent permeable formation before changing to a solid, it is frequently desirable to inject steam for a substantial period of time such as one day to several weeks before injecting the vaporous solid in the steam carrier. It is preferred to inject the fluidized solid in vapor form but it may be in liquid form or in mixed vapor-liquid phases. Hereinafter, the injected material is referred to as vapor but it is not to be construed as limiting the process.

Loss of steam to the adjacent gas cap or aquifer can be detected by various means such as the use of a temperature sensing borehole spaced from the injection well a short but substantial distance and/or a steam profile chart. Immediately upon discovery of loss of steam to the adjoining formation, injection of steam containing the vaporous solid is commenced.

Generally, the concentration of the vaporous solid in the steam carrier is controlled in the range of 5 to 20 weight percent but may be higher or lower than this range. A concentration of about 10 weight percent is preferred. The amount of vaporous solid to be injected into the oil stratum depends upon the permeability characteristics of the adjacent formation and the thickness thereof. Generally, this amount ranges from about 200 to 2000 lbs. of solid per foot of thickness of the permeable formation but higher and lower amounts can be utilized successfully in some formations. The preferred amount is in the range of 800–1000 lbs. per foot of formation thickness.

The channels thru which the driving fluid bypasses the oil stratum are selectively plugged so that the steam or other driving fluid is forced to move thru the oil zone where it displaces oil into one or more offset wells. By injecting certain solid, water-insoluble, oil-soluble substances such as naphthalene, diphenyl, anthracene, and the like, into steam as it moves into the wellhead, these substances are vaporized and carried by the steam into the oil stratum. As the mixture of steam and vaporous solid moves thru the channels of the oil stratum, it eventually arrives in the adjoining formation where the temperature is below the melting point of the vaporous solid and it solidifies so as to cause the channels to become plugged as the solid material accumulates. As the heat bank moves out radially into the oil stratum from the injection well by conduction, the deposited material melts and flows farther out, resolidifying in the adjoining formation to restrict fluid movement beyond the area of original plugging. Such substances cannot plug zones containing substantial quantities of oil since they dissolve in the oil and do not resolidify.

A number of readily vaporizable solids which are suitable for use in the invention are listed below with their melting and boiling points:

| Compound | Melting Point, °C. | Boiling Point, °C. |
| --- | --- | --- |
| Acenapthene | 95 | 278 |
| Stearic acid | 70 | ¹291 |
| Diphenyl | 69 | 255 |
| Naphthalene | 80 | 218 |
| p-dichlorobenzene | 53 | 174 |
| p-dibromobenzene | 87 | 220 |
| 1,2,4,5-tetramethylbenzene | 79 | 196 |
| Pentamethylbenzene | 54 | 232 |
| 1,4-di-tertiary-butylbenzene | 77 | 235 |
| Hexaethylbenzene | 127 | 296 |
| 1,2-dioctadecylbenzene | 70 | |
| Camphene | 39 | 160 |
| 1,5-dimethylnaphthalene | 82 | 265 |
| 1,7-dimethylnaphthalene | 85 | 261 |
| 2,3-dimethylnaphthalene | 104 | 265 |
| 2,7-dimethylnaphthalene | 96 | 262 |
| 1,2,4-trimethylnaphthalene | 50 | 146 |
| 1,3,5-trimethylnaphthalene | 43 | 140 |
| 1,4,5-trimethylnaphthalene | 63 | 145 |

¹ 110 mm.

Other solid materials not listed may also operate in the process, it being essential that they be oil-soluble, water-insoluble, and have a boiling point below about 300° C. and a melting point above the normal formation temperature into which the solids are to be solidified. Steam is injected at a temperature substantially above the boiling point of the solid to be vaporized and is preferably above a temperature of 275° C. Steam temperatures in the range of 225–300° C. are commonly used in steam flooding operations and such temperatures are adapted to the transport of the vaporized solid into the oil stratum and to the channels in the adjoining formation which are to be plugged. When operating with selected steam temperatures, the solid to be vaporized should be chosen to have a boiling point substantially below the temperature of the saturated steam and a melting point substantially above the normal temperature of the formation to be plugged. The tables of the physical properties of organic compounds provide many possibilities for use under a variety of conditions and the short list of materials above should not be considered to restrict the scope of the materials to be used in the process of the invention.

A more complete understanding of the invention may be had by reference to the accompanying schematic drawing which is an elevation in partial section thru an oil stratum with an adjoining gas cap and a substratum.

Referring to the drawing an oil stratum 10 lies between a gas cap 12 and a substratum 14 and is penetrated by a well 16 which is provided with a casing 18. A tubing string 20 extends from above the wellhead down to oil stratum 10 and is connected with a steam line 22 which leads from a steam generator not shown. A tank 24 is provided with heating means 26, which may be a steam jacket, an electric heater, or a gas fired heater for maintaining a melt of the selected plugging agent or solid to be vaporized. Tank 24 is connected with steam line 22 by means of conduit 28 in which is positioned a pump 30.

Casing 18 is provided with perforations 32 within oil stratum 10 for injection of fluid driving agent and steam containing the vaporized solid to be injected.

In operation, the selected solid in tank 24 is maintained in molten condition by heater 26 and the liquid material is injected thru line 28 by means of pump 30 into steam passing thru line 22 into tubing string 20. The injected steam and vaporous solid are forced into the oil stratum 10 from tubing string 20 thru perforations 32, preferably after heating up the stratum immediately surrounding well 16 by steam injection, and the injected steam carrying the vaporous solid follows the path shown by arrows 34 into formation 12 where the temperature is below the melting point of the selected vaporous solid, thereby causing solid formation in zone 36 so that continued flow of steam follows the path of arrow 38 and also moves laterally or horizontally into oil stratum 10 directly from perforations 32. As the heat zone moves radially away from well 16 toward offset production wells (not shown) at least a portion of the solidified material in zone 36 is vaporized and moves deeper into the formation.

In the event there is later dissipation or flow of driving fluid into formation 12 from oil stratum 10, additional steam and vaporous solid is injected in the same manner as initially to effect further plugging as the oil bank developed by the flood is pushed thru the stratum to the offset wells.

Another embodiment of the invention comprises fracturing the gas formation horizontally from the injection well at a level near the interface between the oil stratum and the gas formation. This fracturing may be effected by well-known techniques conventionally utilized in the art. After forming the fracture extending deep into the formation radially from well 16, steam carrying vaporous solid is injected thru the perforations in the casing thru which the fracturing fluid was forced so as to plug the walls of the fracture and seal off the gas formation by deposition of the selected solid in the porous formation adjacent the fracture. After the plugging agent is deposited in the formation thru the fracture, the perforations thru which same have been injected are sealed off in any suitable manner.

When an oil zone such as stratum 10 lies above an adjacent aquifer, the technique used for plugging the aquifer and sealing same off from the oil stratum is similar to that applied to the gas cap. The water in the aquifer quickly cools the invading stream of steam and vaporous solid so as to seal off the channels leading into the aquifer from the oil stratum.

Certain modifications of the invention will become apparent to those skilled in the art and the illustrative details disclosed are not to be construed as imposing unnecessary limitations on the invention.

I claim:
1. A process for producing oil from an oil stratum lying adjacent a permeable formation containing a fluid other than oil comprising the steps of:
   (1) horizontally fracturing said formation near the interface between said stratum and said formation around an injection well therein;
   (2) injecting steam containing a vaporized solid insoluble in water and soluble in oil thru said well into the fracture formed by step (1) so as to plug the walls of said fracture by cooling and condensation of said vaporized solid;
   (3) thereafter, injecting a driving fluid capable of displacing oil from said stratum thru said injection well into said stratum toward at least one production well so as to displace oil thereinto; and
   (4) producing the displaced oil.
2. The process of claim 1 wherein said formation is a gas cap.
3. The process of claim 1 wherein said formation is an aquifer.
4. The process of claim 1 wherein said vapor of step (1) is in the range of 1 to 50 weight percent of the slug.
5. The process of claim 1 wherein said driving fluid is aqueous.
6. The process of claim 1 wherein said driving fluid is steam.
7. The process of claim 1 wherein the concentration of said solid in said steam is in the range of 5 to 20 weight percent.
8. The process of claim 7 wherein an amount of said vapor in the range of 100 to 2000 pounds per foot of thickness of said formation is injected in said steam.

9. The process of claim 1 including the steps of periodically, during step (3), injecting a slug of said vapor.

References Cited

UNITED STATES PATENTS

| | | | |
|---|---|---|---|
| 1,379,657 | 5/1921 | Swan | 166—25 |
| 2,923,356 | 2/1960 | Glass et al. | 166—21 X |
| 3,057,405 | 10/1962 | Mallinger | 166—25 |

OTHER REFERENCES

Andresen et al., "Selective Exclusion of Water in Secondary-Recovery Operations," Secondary Recovery of Oil in the United States, second edition, American Petroleum Institute, 50 W. 50th St., New York, N.Y., 1950, pp. 267–281.

STEPHEN J. NOVOSAD, *Primary Examiner.*